(No Model.)
D. A. CARPENTER.
GLOVE FASTENER.
No. 373,797. Patented Nov. 22, 1887.
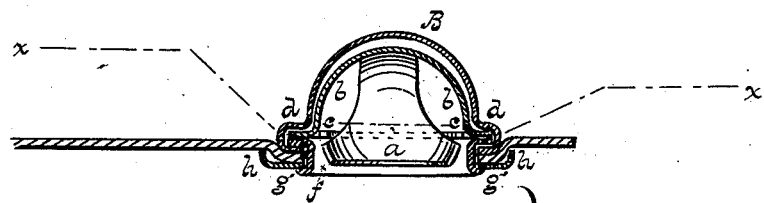
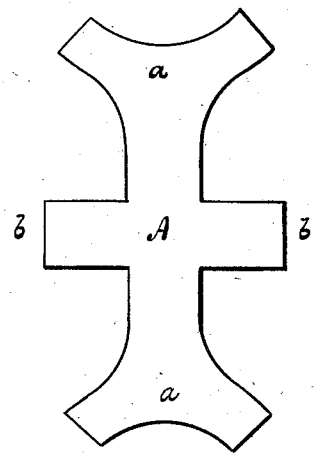
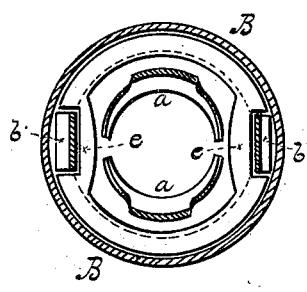
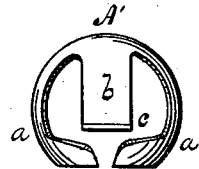
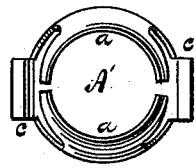
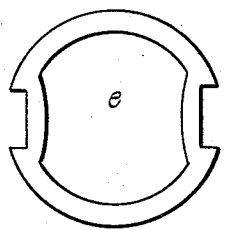
WITNESSES: INVENTOR

UNITED STATES PATENT OFFICE.

DANIEL A. CARPENTER, OF NEW YORK, N. Y., ASSIGNOR TO THE BALL AND SOCKET FASTENER COMPANY, OF BOSTON, MASSACHUSETTS.

GLOVE-FASTENER.

SPECIFICATION forming part of Letters Patent No. 373,797, dated November 22, 1887.

Application filed March 16, 1887. Serial No. 231,110. (No model.)

*To all whom it may concern:*

Be it known that I, DANIEL A. CARPENTER, of the city, county, and State of New York, have invented a certain new and useful Improvement in Fasteners for Gloves and other Articles, of which I declare the following to be a full, clear, and exact specification, reference being had to the accompanying drawings, forming a part thereof.

This invention relates to improvements in fastening devices which belong to the class known as "separable fasteners," and which are composed of a stud and a spring head or socket with which the stud engages; and the object of the invention is to provide the head of such fasteners with an improved spring, as will be made more particularly to appear from the following description and claims.

In the accompaning sheet of drawings, Figure 1 is a view of the head of my fastener in section and of a stud. Fig. 2 represents the blank from which the spring is formed. Fig. 3 is an under side view of the completed spring. Fig. 4 is a side elevation of the same. Fig. 5 shows a washer of a peculiar form; and Fig. 6 is a section viewed from above through the plane indicated by the line $x\ x$, Fig. 1.

Similar letters of reference indicate like parts in the several views.

Perhaps the best spring now employed in glove-fasteners is one that corresponds approximately in form to a section of a hollow sphere and that is continuous from one side of the neck of the stud which it receives over the head of the stud to the opposite side of the neck. Such springs have been for a considerable time in common use, but under unfavorable conditions. Their natural capacity for expansion and contraction is so restricted through the ordinary methods of connecting them with the other parts of the fastener as to invariably interfere with their usefulness, and not infrequently the final consequence is that the springs become set and are no longer of any utility whatever. It is to furnish a way of remedying this evil that constitutes the special aim of the present invention.

In the drawings, A represents a blank, from which a spring, A', is struck up into the form shown in Figs. 3 and 4. The blank, it will be observed, is composed of two pairs of members, one pair of which, $a\ a$, are broadest at their outer ends and form the socket for the stud, while the others, $b\ b$, are constant in width and serve as arms, by which the spring is held in place. Each of these arms is bent sharply outward at a point, $c$, so that when the spring is in an upright position a small portion of each arm close to its lower end extends in a horizontal direction. A shell, B, receives the spring so constructed. This shell is provided with a slight shoulder, $d$, and against this shoulder rests the upper surface of the horizontal portion of each of the arms $b\ b$, while the members $a\ a$, which form the socket, need not anywhere come in contact with the walls of the shell. A washer, $e$, with notches in its edge, into which enter the horizontal parts of the arms $b\ b$, is next placed in position, resting on the shoulder $d$. The purpose of this washer is to fill the spaces which would otherwise be left along the shoulder $d$ between the arms $b\ b$, so that a suitable support may be afforded for the eyelet $f$, and the rim of the head, when finished, may be at all points of an even thickness. The lower edge of the shell is turned over the flange of the eyelet, as shown in Fig. 1, with which operation the construction of the head is completed.

To attach the head to the material of a glove or other article, the eyelet $f$ is passed through the same and through a washer, $g$, and upset in the ordinary manner. The washer $g$ is supplied with a narrow lip, $h$, (see Fig. 1,) a trifle larger in circumference than the rim of the head, and when the head and washer have been crowded tightly together with the material of a glove, for example, between them and the eyelet properly upset, the head becomes firmly clamped to the material not only at the base of the head, but also around the edge of the rim, and thus the head is attached to the glove in a way that is particularly secure.

The stud employed as the counterpart of the head, whose construction has now been fully explained, needs no detailed description, for it is essentially the same as that used in all fasteners of the variety to which this one belongs, and its character will be readily perceived from the drawings.

It is obvious that such a spring as the one herein described, when united to the other parts of the fastener in the manner set forth, is subject to less injurious restraint than are the other springs now in use which are nearest like this, inasmuch as these are secured in place by eyelets passing through perforations in the springs, or by flanges formed on their sides in the vicinity of the opening which receives the stud, both of which means of fastening resist the natural elasticity of the spring, and therefore in this particular form of spring the energy inherent in the material out of which the spring is made is utilized to a greater extent than is the case in the others, and the result is that the capacity of the spring is increased, and consequently its liability to become set and so worthless is diminished.

Having now described my invention, what I claim as new, and desire to secure by Letters Patent, is—

1. In a fastening device, the spring herein described, consisting of the several members, all integral at the upper portion of the spring and extending downward, part of said members conforming closely throughout their whole extent to the outline of a sphere and forming a socket for the reception of a stud, and the others deviating somewhat from a spherical shape near their lower ends and constituting arms $b$, by which the spring is attached to its support, substantially in the manner described.

2. In a fastening device, a hollow and approximately spherical spring having members $a\ a$ formed into a socket for the reception of a stud, and arms $b\ b$, by which the spring is attached to its support, as and for the purpose described.

3. In a fastening device, a hollow and approximately spherical spring having arms $b\ b$, combined with a washer, $e$, provided with notches at its edge to receive the ends of said arms, as and for the purpose described.

4. In a fastening device, a head composed of a shell, B, a hollow and approximately spherical spring consisting of a socket for the reception of a stud, and arms $b\ b$, with short horizontal portions near their lower ends, a washer, $e$, and an eyelet, $f$, said elements being constructed and combined substantially in the manner and for the purpose described.

DANIEL A. CARPENTER.

In presence of—
 T. G. EARL,
 FRED. HEMMING.